(No Model.)  5 Sheets—Sheet 1.

W. O. BEMENT.
SWAGING MACHINERY.

No. 555,635.  Patented Mar. 3, 1896.

Witnesses
H. Ward Bates
Richard Ward Greene

Inventor
William O. Bement
By Attorney C.H. Washburn (No Model.)  5 Sheets—Sheet 2.

W. O. BEMENT.
SWAGING MACHINERY.

No. 555,635.  Patented Mar. 3, 1896.

Witnesses  
N. Ward Bates  
Richard Ward Greene

Inventor  
William O. Bement  
By Attorney C. J. Washburn.

(No Model.)  5 Sheets—Sheet 3.

W. O. BEMENT.
SWAGING MACHINERY.

No. 555,635.  Patented Mar. 3, 1896.

Witnesses  Inventor
 William O. Bement
 By Attorney C. H. Washburn.

(No Model.) 5 Sheets—Sheet 4.

W. O. BEMENT.
SWAGING MACHINERY.

No. 555,635. Patented Mar. 3, 1896.

Witnesses
H. Ward Bates.
Richard Ward Greene.

Inventor
William O. Bement
By Attorney C. H. Washburn.

(No Model.) 5 Sheets—Sheet 5.

W. O. BEMENT.
SWAGING MACHINERY.

No. 555,635. Patented Mar. 3, 1896.

Witnesses
H. Ward Bates
Richard Ward Greene

Inventor
William O. Bement
By Attorney C. H. Washburn.

UNITED STATES PATENT OFFICE.

WILLIAM O. BEMENT, OF WORCESTER, MASSACHUSETTS, ASSIGNOR TO THE WIRE GOODS COMPANY, OF SAME PLACE.

SWAGING MACHINERY.

SPECIFICATION forming part of Letters Patent No. 555,635, dated March 3, 1896.

Application filed August 23, 1894. Serial No. 521,102. (No model.)

*To all whom it may concern:*

Be it known that I, WILLIAM O. BEMENT, a citizen of the United States, residing at Worcester, in the county of Worcester and Commonwealth of Massachusetts, have invented certain new and useful Improvements in Swaging Machinery, of which the following is a specification.

The object of my invention is to provide an automatic machine in which a coil of wire may be cut into any desired number of uniform pieces, each of which may be swaged for any desired part of its length, and is an improvement upon the machine forming the subject-matter of my application filed May 23, 1894, Serial No. 512,210, the general principle of both machines, excepting the mechanism for making the machine automatic, introduced in this application, being the same.

Figure 1:
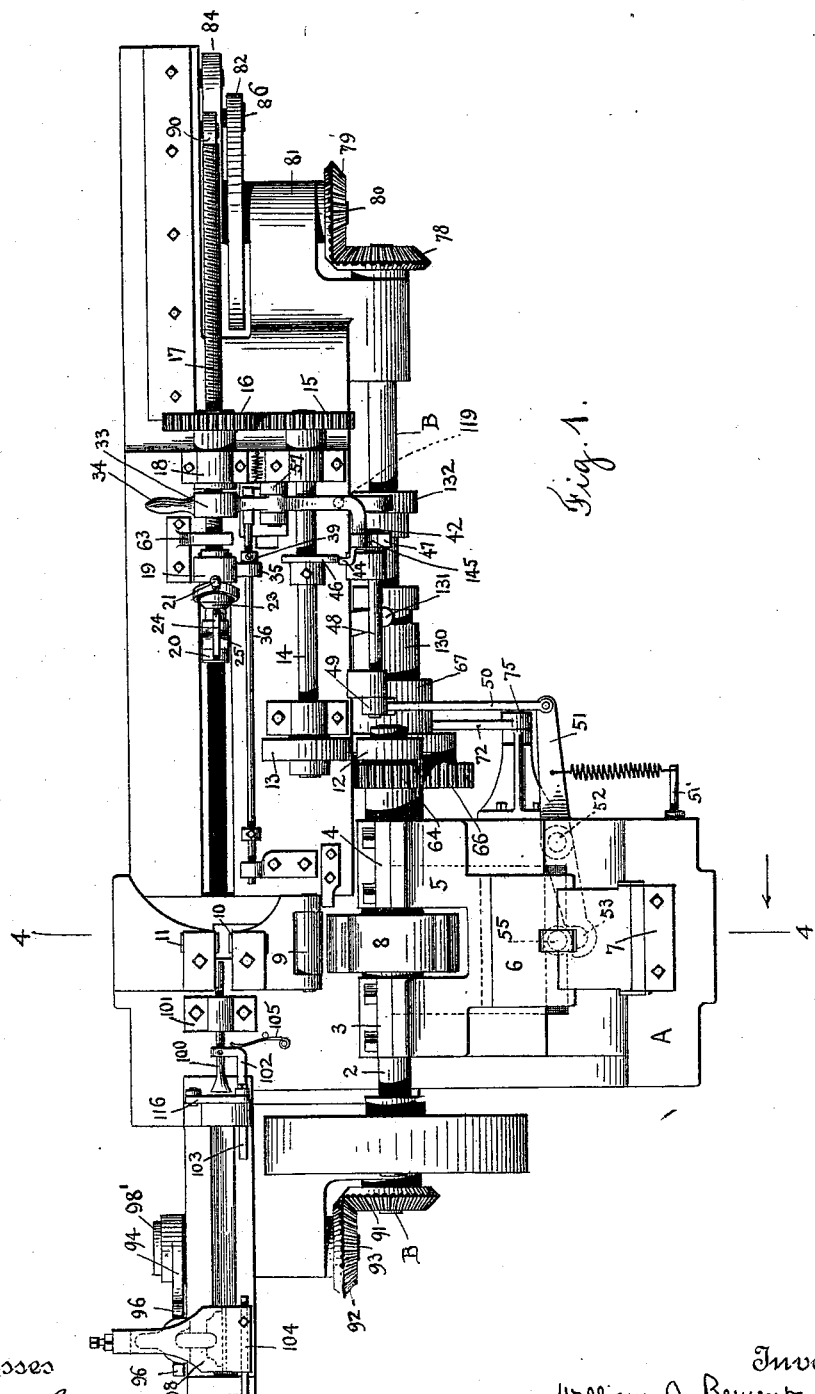
Figure 2:
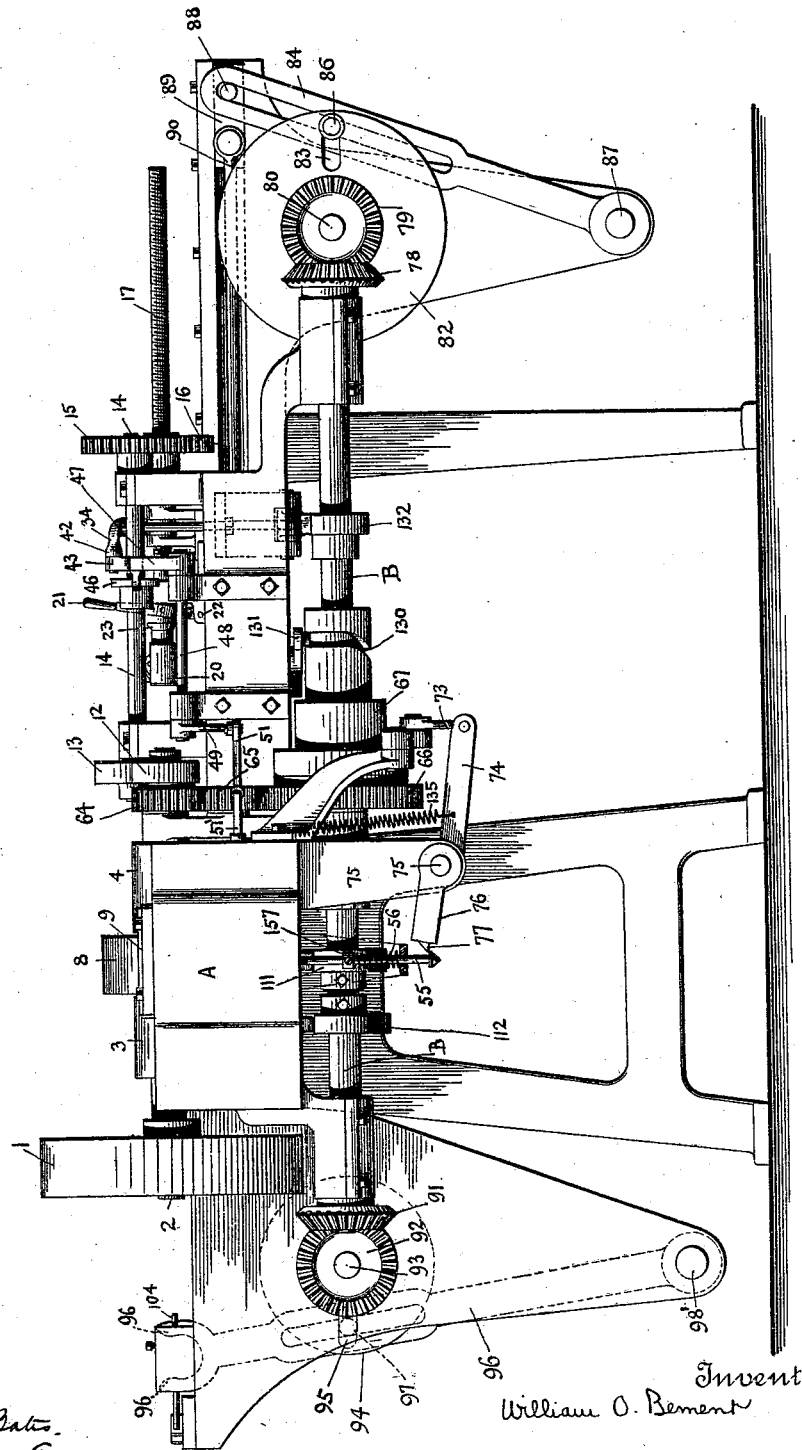
Figure 3:
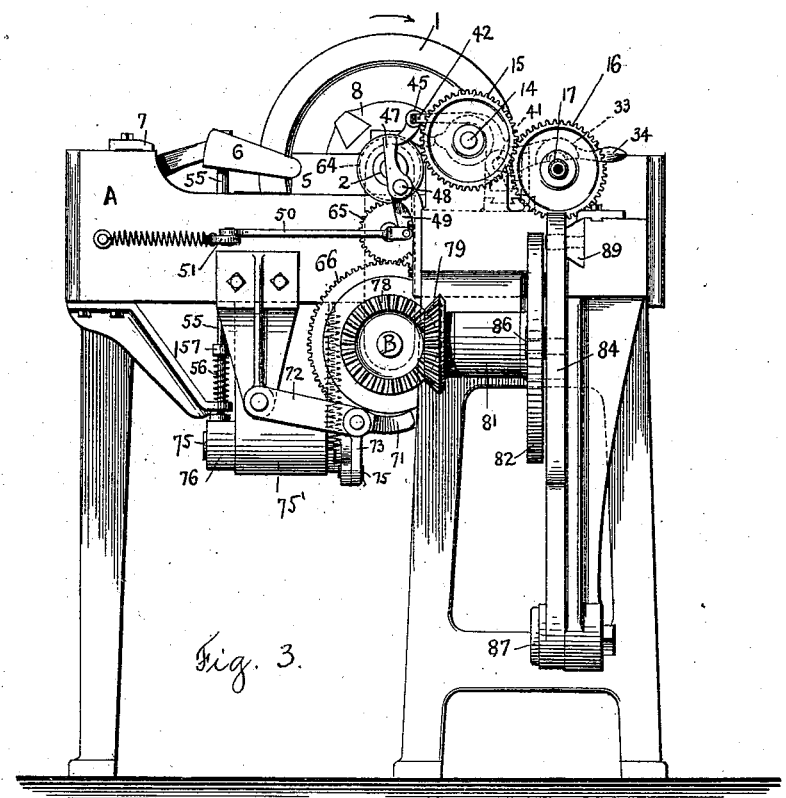
Figure 4:
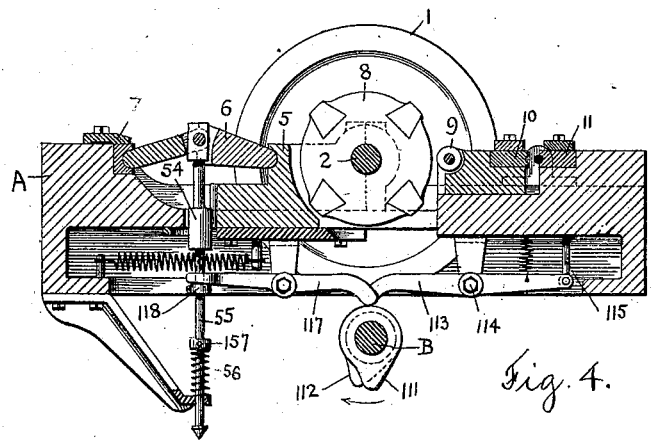
Figure 5:
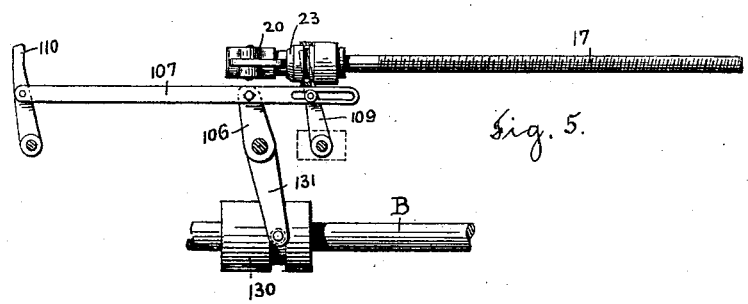
Figure 6:
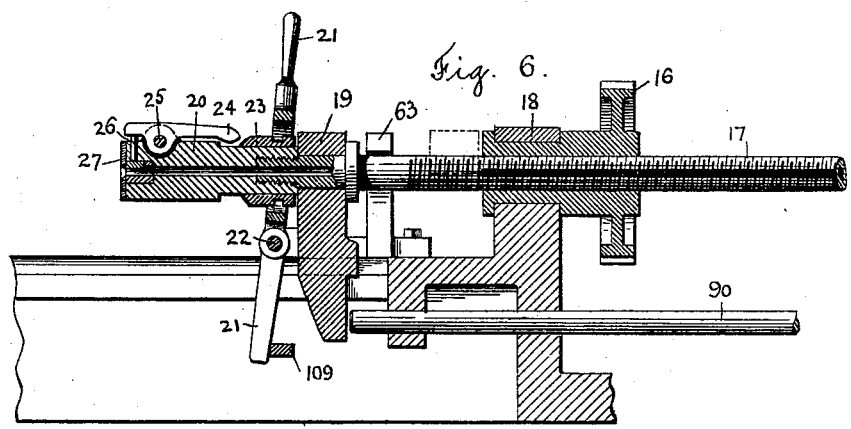
Figures 7, 8:
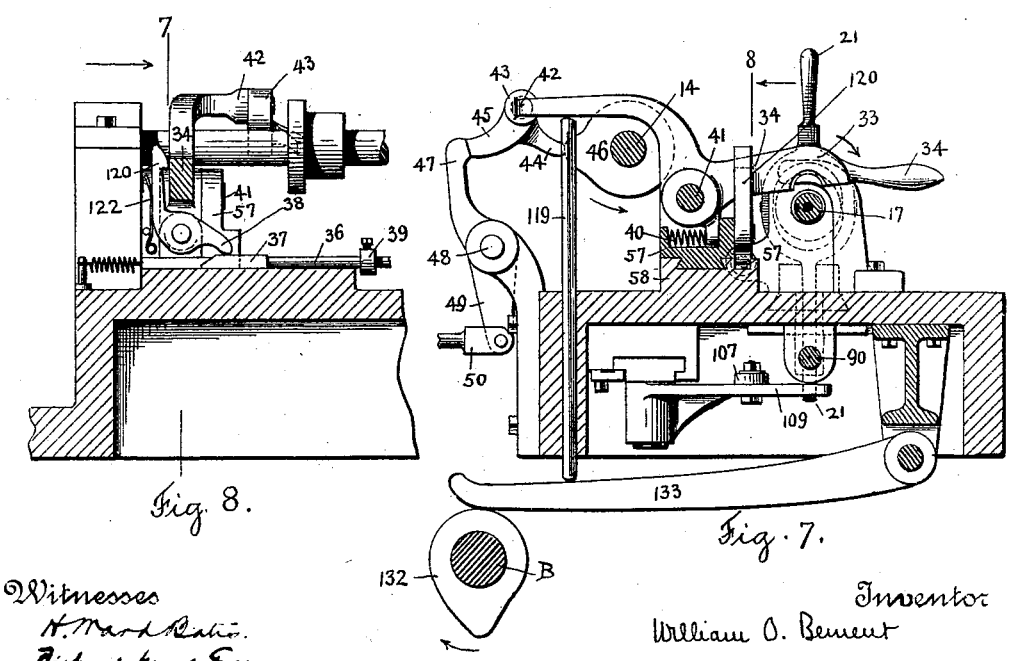
Figure 9:
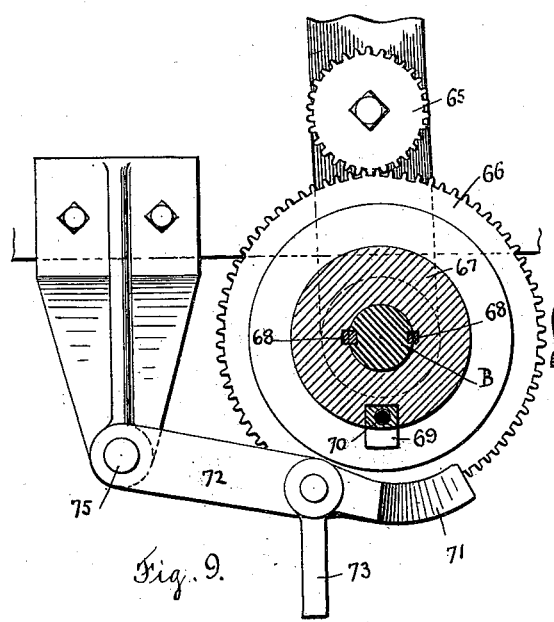
Figure 10:
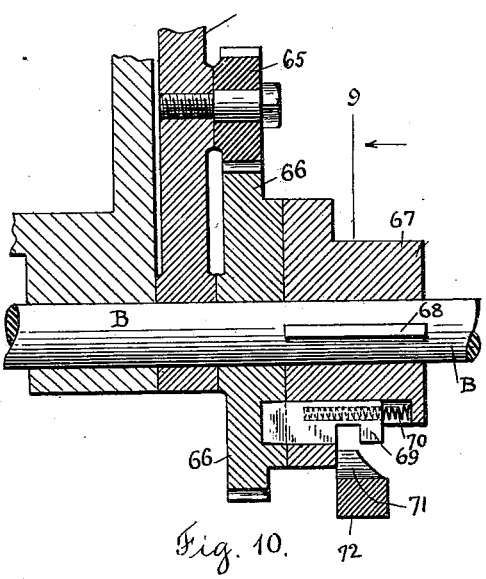
Figure 11:
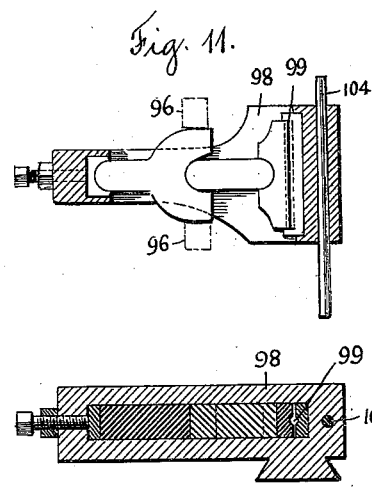
Figure 12:
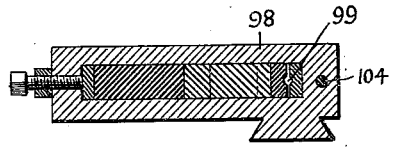
Figure 13:
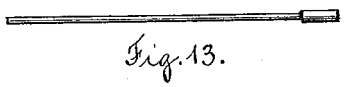

In the accompanying five sheets of drawings, Figure 1 is a plan view of the machine. Fig. 2 is a side elevation. Fig. 3 is an end view of the rear of the machine. Fig. 4 is a sectional view through the line 4 4, Fig. 1. Fig. 5 is a plan view of the chuck-shaft and of the chuck and the mechanism for opening and closing the chuck. Fig. 6 is a side view of the chuck-shaft, somewhat enlarged, and a longitudinal sectional view of the chuck and a side view of the shaft, by means of which the chuck-carriage is returned to its initial position after a rod has been swaged. Fig. 7 is a sectional view, in the direction of the arrow, through the line 7 7, Fig. 8, showing certain details of the construction and operation of the sectional nut by means of which longitudinal motion is imparted to the chuck-shaft. Fig. 8 is a sectional view, in the direction of the arrow, through the line 8 8, Fig. 7, showing details of the catch for holding the sectional nut in engagement with the thread upon the hollow shaft and mechanism for tripping the catch when it is necessary to disengage the nut with the thread upon the shaft. Fig. 9 is an enlarged sectional view, in the direction of the arrow, through the line 9 9, Fig. 10, and shows the loose gear-wheel and clutch, by means of which motion is imparted to the shaft which actuates the mechanism which makes the machine automatic and the mechanism by which the clutch is engaged and disengaged. Fig. 10 is a partial longitudinal sectional view of the mechanism shown in Fig. 9 and a longitudinal view of that part of the shaft which carries such mechanism. Fig. 11 is a plan view of the feed-grip and of the carriage to which the feed-grip is attached. Fig. 12 is an end sectional view of the same. Fig. 13 is a view of a rod swaged for part of its length.

In the operation of the machine the rod to be swaged must be conveyed to the chuck, where it is firmly held while it is severed from the coil. Rotary and longitudinal motion are then imparted to it, during which time the swaging-dies act upon its surface. At the proper time the rod must be disengaged from the chuck and the chuck-head must be returned to its initial position to receive another rod in order that the operation may be repeated.

I will now proceed to describe the details of the mechanism necessary to perform these various operations.

In Fig. 1 A is the bed of the machine, which may be mounted upon any suitable support.

1 is a pulley which may receive power from the driving-shaft. The pulley 1 is mounted upon a shaft 2, which runs in suitable boxes 3 4 upon a movable cam-carriage 5, and the shaft may be kept in continuous operation whether the other working parts of the machine are running or not. The cam-carriage is connected at its rear end by means of a knuckle-joint at the point 6 with the plate 7, which is secured to the rear of the bed of the machine and in such a manner that when the knuckle-joint is raised, as in Figs. 1 and 4, the cam-head 8, mounted upon the shaft 2, is thrown out of contact with the roll 9, through which the movable swaging-die 10, mounted upon a suitable way, is actuated. Movable die 10 is opposed by a similar die 11, which I prefer to have stationary, although it may be movable. The cam-head 8 may be so constructed as to give any required number of blows during each revolution of shaft 2.

In practice I prefer to construct my machine, as shown in the drawings, to give four blows at each revolution.

At the opposite side of the shaft 2 from the main pulley 1 is the pulley 12, which has frictional contact with the pulley 13 upon the shaft 14, so that when these pulleys are in contact the shaft 14 may be revolved. Upon the opposite end of shaft 14 is a gear-wheel 15, which meshes with the gear-wheel 16, which operates the chuck-baring shaft 17, which revolves continuously while the swaging mechanism of the machine is in operation. The chuck-bearing shaft 17 is mounted in suitable boxes 18 19, the former of which is secured to the bed of the machine and the latter of which may be moved longitudinally in properly-constructed ways upon the bed of the machine. The chuck 20 is mounted upon the end of the shaft 17 and contains a holding device operated by the lever 21, pivoted at 22. (Shown in detail in Fig. 6.) When the chuck-lever is thrown forward the collar 23 is advanced under the rear end of the lever 24, pivoted at 25. This depresses the pin 26, which bears against the movable part 27 of the bushing, and securely holds in place the rod which is being swaged.

The shaft 17 is most conveniently made hollow, so that each swaged rod may be pushed through the shaft by the rod which follows and may be delivered at the rear of the machine.

The longitudinal movement of the shaft 17 is secured by means of the sectional nut 33 in the arm 34 adapted to engage with a thread upon the shaft, so that when the two are in contact the shaft 17 will have a positive longitudinal motion which ceases when the two are thrown out of contact, which is accomplished by elevating the nut-arm into the position shown in Fig. 7.

I defer until a later part of the specification explanation of the mechanism shown in Fig. 7, by which the sectional nut is engaged with the thread upon the shaft 17. When this occurs the tendency is to pull the nut-arm laterally. This is overcome by the shoulder 63, securely fastened to the bed of the machine, against which the nut-arm has an abutment.

The machine is so constructed that the longitudinal motion of the chuck-bearing shaft is regulated automatically and in the following manner, (illustrated in Figs. 1 and 8:) The movable box 19 is provided with a projection 35, which embraces the rod 36. As the box 19 travels along with the chuck-bearing shaft, the projecting piece 35 strikes the collar 39, and the rod 36, to which the collar is secured, is moved longitudinally in its bearings until the end of the rod pushes the wedge-shaped piece 37 under the end of lever 38, Fig. 8. This throws the hook end of the lever away from its bearing upon the nut-arm, and the action of the spring 40, Fig. 7, throws the nut out of contact with the shaft 17 and thus causes to cease the longitudinal motion of said shaft. The rotary motion of the shaft 17 continues somewhat longer than the longitudinal motion, but it is also automatically stopped, and in the following manner.

It will be noted upon referring to Figs. 1, 2, 3, 7, and 8 that the nut-arm 34 is loosely pivoted at 41, and that its opposite extremity 42 is loosely secured by means of a pin to the piece 43, which has two cam-like projections 44 45. When the nut-arm 34 is raised it depresses the opposite end 42, which brings projection 44 in position to contact with cam 46 on shaft 14, at which time the projection 44 is depressed and the projection 45 is elevated and comes in contact with the arm 47, which is loosely pivoted at 48, so that when the arm at extremity 47 is moved to the left the opposite extremity 49, pivoted to the rod 50, is moved to the right. The rod 50, Fig. 1, is secured to arm 51, pivoted at 52, and provided at its opposite extremity with a hook 53, adapted to secure a bearing upon the shoulder 54, Fig. 4, upon the rod 55, which controls the knuckle-joint which brings the cam-head 8 in and out of contact with the roll 9, Fig. 1. Now when the rod 50 is pulled to the right, as indicated above, the hook 53 is pulled away from its bearing on the shoulder 54, and the coil-spring 56, Fig. 4, which is compressed when the knuckle-joint is down, is now free to act, and pushing against the shoulder 157 raises the knuckle rod and joint and withdraws the cam-head from contact with the roller 9, thus stopping the action of the swaging-dies and withdrawing the friction-pulley 12 from contact with the friction-pulley 13, thus stopping the rotary motion of the hollow chuck-bearing shaft.

It is important that the rotary motion of the chuck-bearing shaft should begin somewhat before the longitudinal motion in order that the first end of the rod to be swaged may receive an even finish around its entire circumference. To accomplish this the nut-arm is secured to the carriage 57, Figs. 1, 7, and 8, which is capable of slight movement upon the way 58. When the nut is engaged with the thread upon the chuck-shaft it is carried toward the chuck without imparting any longitudinal motion to the shaft until it contacts with the shoulder 63, where it is prevented from any further movement, and the longitudinal motion of the chuck-shaft begins.

I have now described the details of the several mechanisms substantially as they exist, although differing in some particulars, in my pending application above referred to.

I will now describe the details of mechanism new in this application and which make this machine entirely automatic in its operation. This mechanism performs the several operations of feeding the wire from the coil into the machine, securing it in the chuck and cutting the rod to the proper length, imparting rotary motion to the chuck-shaft, and actuating the swaging mechanism, engaging the sectional nut with the thread on the chuck-shaft, in order that longitudinal motion may be imparted to the latter, stopping the action of the swaging-dies and the rotary and longitudinal motion of the chuck-shaft, disengaging the rod from the chuck, and finally returning the chuck-shaft to its initial position after one rod has been swaged and preparatory to the swaging of another. The various mechanisms necessary to effect this are actuated by the shaft B beneath the main shaft 2 of the machine, by which it is driven, through the gear-wheel 64 on shaft 2, the intermediate gear 65 and the gear-wheel 66, which is loose upon shaft B and imparts intermittent motion thereto by means of a clutch device, (illustrated in Figs. 9 and 10,) in which the clutch 67 is secured to the shaft B by means of the spline 68. The clutch-bolt 69 is properly mounted within the circumference of clutch 67, and is backed by the spiral spring 70, which, in its normal position, holds the clutch-bolt in its seat in gear 66. The clutch-bolt is unseated and the gear 66 and clutch 67 are disconnected by means of the wedge 71 on the end of the piece 72, which is loosely pivoted to the bed of the machine.

The wedge is brought in and out of contact with the clutch in the following manner: It is connected by the rod 73, Fig 2, with the piece 74 loosely pivoted to the bed of the machine at 75, but rigidly connected with the piece 76 in the end of which is the catch 77. A shoulder upon the lower end of knuckle-rod 55 (see Figs. 2 and 4) affords upon its upper surface a bearing for the catch 77 when the knuckle-joint is depressed, and when the knuckle-joint is elevated the knuckle-rod pulls upon the catch 77 until it frees itself. This depresses the piece 74, pulls down on the rod 73, disengages the wedge 71 from the clutch-bolt 69, and the loose gear 66 becomes connected with the clutch 67, and motion is thus imparted to the shaft. Meantime the spring 135 has brought the lever 74 back to its normal position, and the wedge 71 is in position to disengage the clutch, so that the shaft B only moves through one revolution, during which time the swaging mechanism is not in operation.

I will now describe the other operations performed by the shaft B and the mechanism for performing them.

Assuming that the rod has just been swaged and unclamped from the chuck, and that the machine must be adjusted to receive a second rod, the first operation is to bring the chuck-head, which is at the extreme end of its path, back to its initial position. This is accomplished by the miter-gears 78 79, the former of which is rigidly attached to shaft B, and the latter of which is rigidly connected with the shaft 80, running in the box 81, (see Fig. 3,) and upon the opposite end of which is the disk 82 containing the slot 83, and connected with the slotted arm 84 by the bolt 86, so that when the disk 82 is revolved the slotted arm will be moved to and fro about a fixed center 87 in the bed of the machine. The free end of the slotted arm is connected by the pin 88 to the carriage 89, secured in proper ways upon the bed of the machine, so that it can travel through a certain distance, longitudinally, at each revolution of the disk 82. To the carriage 89 is secured the rod 90, which at its opposite extremity (see Fig. 6) may be brought in contact with a downwardly-projecting piece, in the upper end of which the chuck-carriage is mounted. When the rod is thrust forward toward the front of the machine by means of the mechanism already explained, it will carry with it the chuck-head to its initial position, ready to receive a rod, and will then recede to the position shown in Fig. 2. At the same time the shaft B actuates mechanism which conveys the wire to be swaged into the chuck. The first step in the process is to feed the wire from the coil into the machine. This is accomplished by the miter-gears 91 92, the former of which is rigidly attached to the shaft B, and the latter of which is rigidly attached to the shaft 93, upon the opposite end of which is the disk 94, containing the slot 95, and connected with the slotted arm 96 by the bolt 97, so that when the disk 94 is revolved the slotted arm will be moved to and fro about a fixed center 98' in the bed of the machine.

Upon referring to Figs. 1, 11, and 12 it will be noted that the free end of the slotted arm 96 is connected through a knuckle working in a horizontal plane with the carriage 98 secured in proper ways upon the bed of the machine, so that it may travel through the desired distance longitudinally at each revolution of the disk 94. Upon the carriage a knuckle-joint is arranged so that when the slotted arm is moved forward it will clamp the wire in the space 99 and carry it into the machine, and when the slotted arm moves back it slips over the wire without gripping it. As the wire is fed to the machine it passes into the bell-shaped mouth of the guide 100. This guide is journaled in the box 101 and also has a bearing in and is embraced by the right-angled piece 102 in such a manner that the guide can be advanced toward the chuck by the action upon the piece 102 of the rod 103, which in turn is pushed forward by the rod 104 in the feed-carriage as the carriage comes forward in feeding the wire into the machine. The guide 100 is partially cut away on its front end to permit of its passing the stationary die 11. Having conveyed the wire to the chuck by means of the guide 100, the latter must be withdrawn before the swaging-dies begin to act; otherwise it would be caught between them. This is effected by the action of the spring 105, which, when the feed-carriage moves away from the chuck, pushes the piece 102, and with it the guide 100, back from between the swaging-dies.

The next step is to secure the wire in the chuck. The mechanism for doing this is clearly illustrated in Figs. 1, 2, 5, and 6. In Figs. 1 and 2 are plan and side views of the cam 130 upon shaft B. Fig. 5 is a plan view of the mechanism connecting the cam on shaft B with the chuck-shaft, the chuck being in position where it should be opened to release a rod already swaged. It will be noted that when the cam carries back the end of arm 131 with which it contacts the other end is moved forward and carries with it the rod 107, which also pulls forward the arm 109, Fig. 6, and opens the chuck, as shown in Figs. 5 and 6. When the chuck-head is in its initial position and the cam carries forward the end of arm 131 with which it contacts, the rod 107 is moved back and the lever 110, striking against the tail of lever-arm 21, closes the chuck upon the wire.

The next operation is to cut off the wire, so that the piece to be swaged may be revolved. Upon turning to Fig. 4 it will be seen that there are two cams 111 and 112 mounted upon the shaft B, 112 being behind the cam 111. In the course of its revolution the cam 112 comes in contact with the downwardly-projecting end of arm 113, pivoted at 114, and raises it. This depresses the opposite end and with it the rod 115 and shears 116, (shown in Fig. 1,) thus severing the rod. It is now necessary to bring the swaging-dies into operation and also to impart rotary and longitudinal motion to the chuck-shaft. The way in which this is accomplished may also be seen by reference to Fig. 4, in which the cam 111, as it revolves, comes in contact with the downwardly-projecting end of arm 117 and elevates it, depressing to a corresponding degree the opposite end, and with it the collar secured to knuckle-rod 55. This depresses the shoulder to a point where the hook 53, Fig. 1, can slip over it and hold the knuckle-rod in this position, thus bringing the cam-head, as it revolves, into contact with roller 9 and actuating the movable swaging-die 10. At the same time the friction-pulleys 12 and 13 are brought into contact, and rotary motion is imparted to the chuck-shaft.

It now remains to explain how longitudinal motion is imparted to the chuck-shaft. As has been said, this is done by engaging the nut with the thread upon the shaft; but the mechanism for doing this automatically has not yet been described.

Upon turning to Fig. 7 there will be seen the cam 132 on the shaft B. As this revolves, it comes in contact with the arm 133 and forces it against the rod 119, which has a bearing on the under side of one extremity of nut-arm 34. This engages the nut 33 with the thread upon the chuck-shaft, which thus has longitudinal motion imparted to it. The nut is held in contact with the thread upon the chuck-shaft by the hook 120, Fig. 8, which slips over the shoulder 121 and is there held by the spring 122.

Having described the details of construction, I will proceed to describe the mode of operation of the machine.

Power is applied to the pulley 1, which actuates the shaft 2, which carries the cam-head 8 and the friction-pulley 12, and which also actuates the shaft B. The shaft 2 may be kept running continuously. The wire is taken from a coil (not shown) at the front of the machine and if necessary may be passed through any convenient form of straightener, and is carried by the feed mechanism, actuated by the shaft B, into the machine. During the operation of swaging the shaft B is stationary. When the chuck-shaft has traveled the required distance it automatically trips the catch which holds the lever-arm in contact with the chuck-shaft and through mechanism already explained throws up the knuckle-joint 5, thus withdrawing the cam from contact with the roller which actuates the swaging-die and at the same time drawing out of contact the friction-pulleys 12 and 13, thus stopping the rotary motion of the chuck-shaft. At the same time the clutch operates upon the gear-wheel 66 and the shaft B makes one revolution, during which time it disengages from the chuck the rod which has been swaged, carries the chuck-carriage to its initial position, feeds and guides the wire into the chuck, and cuts it to the required length, clamps the rod to be swaged firmly in the chuck, brings the sectional nut in contact with the thread upon the chuck-shaft, throws down the knuckle 5, which starts the swaging-die and imparts rotary motion to the chuck-shaft. The shaft B has then completed its revolution and the operation may be repeated indefinitely.

Having described my invention, what I claim as new, and desire to secure by Letters Patent, is—

1. In a swaging-machine, the combination of a primary shaft mounted in a movable carriage and carrying a cam, swaging mechanism adapted to be actuated by said cam, a shaft adapted to receive rotary and longitudinal motion, and provided with a chuck, mechanism whereby rotary and longitudinal motion may be imparted to said shaft, mechanism for feeding the wire into the machine, mechanism for securing the wire in the chuck, mechanism for cutting the wire, mechanism for disengaging the wire from the chuck, mechanism for returning the chuck-carriage to its initial position, a secondary shaft and connecting and operating mechanism adapted to automatically operate the feeding mechanism, and mechanism for securing the wire in the chuck, and cutting mechanism, and mechanism for imparting rotary and longitudinal motion to the chuck-shaft, and mechanism for disengaging the wire from the chuck, and mechanism for returning the chuck-carriage to its initial position, substantially as described.

2. In a swaging-machine, the combination of a primary shaft carrying a cam and mounted in a movable carriage, swaging mechanism adapted to be actuated by said cam, a shaft provided with a chuck adapted to receive rotary motion, mechanism for imparting rotary motion to said shaft, which is provided with a thread upon its exterior surface adapted to engage with a nut, whereby longitudinal motion may be imparted to said shaft, a swinging arm provided with a suitable clamping device for feeding the wire into the machine, mechanism for securing the wire in the chuck, mechanism for cutting the wire, mechanism for disengaging the wire from the chuck, a second arm connected with a rod adapted to contact with the chuck-carriage, a secondary shaft and connecting and operating mechanism adapted to automatically operate the feeding-arm, and mechanism for securing the wire in the chuck, and cutting mechanism and mechanism for imparting rotary and longitudinal motion to the chuck-shaft, and mechanism for disengaging the wire from the chuck and the arm for returning the chuck-carriage to its initial position, substantially as described.

3. In a swaging-machine, the combination of a primary shaft carrying a cam, and mounted in a movable carriage, swaging mechanism adapted to be actuated by said cam, a hollow shaft, provided with a chuck, adapted to receive rotary and longitudinal motion, mechanism for imparting rotary and longitudinal motion to said hollow shaft, mechanism for regulating the length of the unswaged portion of each piece swaged, a swinging arm provided with a suitable clamping device for feeding the wire into the machine, mechanism for securing the wire in the chuck, mechanism for cutting the wire, mechanism for disengaging the wire from the chuck, a second arm connected with a rod adapted to contact with the chuck-carriage, a secondary shaft, and connecting and operating mechanism adapted to automatically operate the feeding-arm, and mechanism for securing the wire in the chuck, and cutting mechanism, and mechanism for imparting rotary and longitudinal motion to the chuck-shaft, and mechanism for disengaging the wire from the chuck, and the arm for returning the chuck-carriage to its initial position, substantially as described.

4. In a swaging-machine, the combination of a primary shaft carrying a cam, mounted in a carriage, connected with a knuckle-joint, swaging mechanism adapted to be actuated by said cam, a shaft provided with a thread upon its exterior surface adapted to receive rotary motion from the primary shaft, connecting mechanism for imparting said rotary motion, a lever provided at one end with a nut adapted to engage with said threaded shaft, whereby longitudinal motion may be imparted to the latter, a secondary shaft provided with a cam adapted to actuate a lever which has a bearing upon a rod connecting it with the nut-lever, and provided with a second cam adapted through connecting mechanism to depress the knuckle-joint attached to the cam-carriage, whereby the nut may be engaged with the thread upon the threaded shaft, and the knuckle-joint may be depressed, and rotary and longitudinal motion automatically imparted to the threaded shaft, substantially as shown and described.

5. In a swaging-machine, the combination of a primary shaft carrying a cam and mounted in a carriage connected with a knuckle-joint, swaging mechanism adapted to be actuated by said cam, a shaft provided with a thread upon its exterior surface adapted to receive rotary motion, connecting mechanism for imparting said rotary motion, a lever provided at one end with a nut adapted to engage with said threaded shaft, whereby longitudinal motion may be imparted to the latter, and suitable mechanism intermediate the opposite end of said lever and the knuckle-joint connected with the cam-carriage and suitable connecting and operating mechanism whereby the nut-lever may be tripped and disconnected with the threaded shaft, and the knuckle-joint connected with the cam-carriage elevated, whereby the rotary and longitudinal motion of the threaded shaft may be automatically stopped, substantially as shown and described.

WILLIAM O. BEMENT.

Witnesses:
C. G. WASHBURN,
R. M. WASHBURN.